(12) United States Patent
Konaka et al.

(10) Patent No.: US 10,876,979 B2
(45) Date of Patent: Dec. 29, 2020

(54) PROCESSING METHOD, PROCESSING APPARATUS AND PROCESSING PROGRAM CONFIGURED TO DETERMINE CONDITIONS OF POLE FIGURE MEASUREMENT BY X-RAY DIFFRACTION

(71) Applicant: Rigaku Corporation, Akishima (JP)

(72) Inventors: Hisashi Konaka, Akiruno (JP); Akihiro Himeda, Akishima (JP); Toru Mitsunaga, Hachioji (JP); Keigo Nagao, Saitama (JP)

(73) Assignee: RIGAKU CORPORATION, Tokyo (JP)

( * ) Notice: Subject to any disclaimer, the term of this patent is extended or adjusted under 35 U.S.C. 154(b) by 464 days.

(21) Appl. No.: 15/618,433

(22) Filed: Jun. 9, 2017

(65) Prior Publication Data

US 2017/0370860 A1    Dec. 28, 2017

(30) Foreign Application Priority Data

Jun. 24, 2016  (JP) ................. 2016-125248

(51) Int. Cl.
*G01N 23/20*  (2018.01)
*G01N 23/20008*  (2018.01)
(Continued)

(52) U.S. Cl.
CPC ......... *G01N 23/2055* (2013.01); *G01N 23/20* (2013.01); *G01N 23/205* (2013.01);
(Continued)

(58) Field of Classification Search
CPC ............ G01N 23/20; G01N 23/20008; G01N 23/20016; G01N 23/20025; G01N 23/205; G01N 23/2055; G01N 23/207
(Continued)

(56) References Cited

U.S. PATENT DOCUMENTS 6,301,330 B1 * 10/2001 Kurtz ................. G01N 23/20
257/E21.53
6,385,289 B1 * 5/2002 Kikuchi ............. G01N 23/20
378/70
(Continued)

FOREIGN PATENT DOCUMENTS

JP    2012-112708 A    6/2012

OTHER PUBLICATIONS

English translation of JP 2012-112708 A by Patent Translate on Feb. 5, 2020.*
(Continued)

*Primary Examiner* — Allen C. Ho
(74) *Attorney, Agent, or Firm* — Birch, Stewart, Kolasch & Birch, LLP

(57) ABSTRACT

Provided are a processing method, a processing apparatus and a processing program which can perform pole figure measurement continuously without overlapping of an angle a in a pole figure with the small number of times of $\phi$ scan, thereby enabling the efficient measurement. The processing method for determining conditions of pole figure measurement by X-ray diffraction, includes the steps of: receiving input of a diffraction angle $2\theta$; and determining an angle $\omega$ formed by an incident X-ray and an x-axis, and a tilt angle $\chi$ of a sample in each $\phi$ scan for a rotation angle $\phi$ within a sample plane so as to make a range of an angle a continuous from $\alpha = 90°$ to $\alpha = 0°$ without overlapping, the angle $\alpha$ being formed by the sample plane and a scattering vector, the range of the angle $\alpha$ are detectable at a time on a two-dimensional detection plane in the pole figure measurement at the diffraction angle $2\theta$, in which determining the angle $\omega$ and the tilt angle $\chi$ is repeated.

6 Claims, 22 Drawing Sheets

(51) Int. Cl.
  *G01N 23/20016* (2018.01)
  *G01N 23/20025* (2018.01)
  *G01N 23/205* (2018.01)
  *G01N 23/2055* (2018.01)
  *G01N 23/207* (2018.01)

(52) U.S. Cl.
  CPC ..... *G01N 23/207* (2013.01); *G01N 23/20008* (2013.01); *G01N 23/20016* (2013.01); *G01N 23/20025* (2013.01)

(58) Field of Classification Search
  USPC .................................. 378/71–73, 79, 81, 76
  See application file for complete search history.

(56) References Cited

U.S. PATENT DOCUMENTS

| | | | | |
|---|---|---|---|---|
| 6,678,347 B1 * | 1/2004 | Kozaczek | ............ | G01N 23/207 378/74 |
| 6,792,075 B2 * | 9/2004 | Kozaczek | ............. | G01B 15/02 378/50 |
| 6,873,681 B2 * | 3/2005 | Toraya | ................. | G01N 23/207 378/71 |
| 6,882,739 B2 * | 4/2005 | Kurtz | .................... | G01N 23/20 356/30 |
| 6,937,694 B2 * | 8/2005 | Yokoyama | ........... | G01N 23/207 378/70 |
| 6,999,557 B2 * | 2/2006 | Yamaguchi | ............ | G01N 23/20 378/71 |
| 7,035,373 B2 * | 4/2006 | Omote | ................... | G01N 23/20 378/71 |
| 7,120,227 B2 * | 10/2006 | Ozawa | ............... | G01N 23/2055 378/87 |
| 7,158,609 B2 * | 1/2007 | Kikuchi | ............... | G01N 23/205 378/70 |
| 7,190,762 B2 * | 3/2007 | He | ...................... | G01N 23/207 378/70 |
| 7,206,378 B2 * | 4/2007 | Obata | .............. | G01N 23/20016 378/162 |
| 7,257,192 B2 * | 8/2007 | Omote | ................... | G01B 15/02 378/70 |
| 7,337,098 B2 * | 2/2008 | Yokoyama | ............. | G01N 23/20 378/73 |
| 7,416,604 B2 * | 8/2008 | Ishibashi | ............... | C30B 29/403 117/89 |
| 7,443,952 B2 * | 10/2008 | Dosho | .................... | G01N 23/20 378/71 |
| 7,620,149 B2 * | 11/2009 | Je | ......................... | G01N 23/046 378/71 |
| 7,646,847 B2 * | 1/2010 | He | ....................... | G01N 23/207 378/71 |
| 7,646,849 B2 * | 1/2010 | Iwasaki | .................. | B82Y 10/00 378/70 |
| 7,711,088 B2 * | 5/2010 | Gibson | ................ | G01N 23/207 378/71 |
| 7,801,272 B2 * | 9/2010 | Toraya | ................. | G01N 23/207 378/71 |
| 8,111,807 B2 * | 2/2012 | Ida | ....................... | G01N 23/207 378/70 |
| 8,340,248 B2 * | 12/2012 | Toraya | ................... | B82Y 10/00 378/70 |
| 8,771,552 B2 * | 7/2014 | Ishibashi | ............... | C30B 29/403 117/106 |
| 8,903,044 B2 * | 12/2014 | Asano | ............ | G01N 23/20008 378/71 |
| 8,953,743 B2 * | 2/2015 | Yasukawa | ........... | G01N 23/207 378/72 |
| 9,128,029 B2 * | 9/2015 | Morikawa | ............. | G01N 23/20 |
| 9,218,315 B2 * | 12/2015 | Mitsunaga | ............. | G06F 17/00 |
| 9,442,084 B2 * | 9/2016 | Kakefuda | ........... | G01N 23/207 |
| 9,835,570 B2 * | 12/2017 | Park | ...................... | G01N 23/207 |
| 9,897,559 B2 * | 2/2018 | He | ...................... | G01N 23/20016 |
| 10,295,484 B2 * | 5/2019 | He | ....................... | G01N 23/207 |

OTHER PUBLICATIONS

Bob B. He, "Two-Dimensional X-ray Diffraction", John Wiley & Sons, Inc., 2009, 18 pages.

* cited by examiner

FIG. 10

PROCESSING METHOD, PROCESSING APPARATUS AND PROCESSING PROGRAM CONFIGURED TO DETERMINE CONDITIONS OF POLE FIGURE MEASUREMENT BY X-RAY DIFFRACTION

BACKGROUND OF THE INVENTION

Field of the Invention

The present invention relates to a processing method, a processing apparatus and a processing program for determining conditions of a pole figure measurement by X-ray diffraction.

Description of the Related Art

In the past, in the pole figure measurement using a zero-dimensional detector, as to a tilt angle $\chi$ and a rotation angle $\phi$ within a sample plane, pole figures have been prepared by measuring the intensity with the $\chi$ step and the $\phi$ scan. At this time, the intensity measured with $\chi$ and $\phi$ is expressed as an intensity at the position where $\alpha$ is $90°-\chi$, and $\beta$ is $\phi$ in the pole figure. That is, the control position on a mechanism is represented by $\chi$, $\phi$ and $\omega$, and the position on the pole figure is represented by $\alpha$ and $\beta$.

FIG. 11A is a diagram showing the detection range via a zero-dimensional detector when $\beta$ is set to be constant. As shown in the figure, with the measurement carried out by the zero-dimensional detector, the measurement range obtained by one-time exposure is represented by dots.

In contrast, with the pole figure measurement using a two-dimensional detector, the measurement can be carried out with dots which are continuous in the $\alpha$ direction by one-time exposure (refer to Non-Patent Document 1). FIG. 11B is a diagram showing the detection range via a two-dimensional detector when $\phi$ is set to be constant. As shown in the figure, with the measurement carried out by the two-dimensional detector, the measurement range obtained by one-time exposure is represented by a curve (arc).

As shown in FIG. 12A, the range within a circle having a certain radius from the center of the pole figure can be measured by being set to $\chi=0°$, and carrying out the pole figure measurement in which $\phi$ scan (0 to 360°) is carried out, using the two-dimensional detector. At this time, the entire range of a pole figure can be prepared by carrying out the $\phi$ scan measurement while varying $\chi$ in a stepwise manner.

In an example of FIG. 12B, the measurement is carried out by dividing $\alpha$ into four steps to measure the entire range. The measurement condition needs to be input by the user with the inclusion of to what degree steps are to be taken in such a measurement.

PRIOR ART DOCUMENT

Non-Patent Document

Non-Patent Document 1: Bob B. He, Wiley, Two-dimensional X-ray diffraction, 2009, P 226, P 229

With the pole figure measurement using the two-dimensional detector as described above, if a wider range of measurements can be carried out in the first $\chi$ step, the number of $\chi$ steps can end up with 3, thereby leading to reduction in measuring time. Therefore, a wider range of $\alpha$ can be covered by setting $\omega$ to, for example, $\chi=30°$ at the symmetrical arrangement of a half of the diffraction angle ($2\theta$).

However, at this time, no measurement can be carried out around $\alpha=90°$ in the pole figure only by simply changing $\chi$, and shifting the measurement range of $\alpha$. Specifically, it becomes critical that the intensity data around $\alpha=90°$ cannot be measured, when measuring a sample which is strongly oriented in a normal direction of the sample plane.

Further, for example, in the system disclosed in Non-Patent Document 1, a wide range of pole figures are measured at a time and the measuring time is reduced by tilting a sample to measure it in the pole figure measurement using the two-dimensional detector. However, in the example of FIG. 8.7, the center of the pole figure has not been able to be measured. FIG. 13 is a diagram showing the detection range when tilting a sample at $\chi=30°$ and carrying out $\beta$ scan. As shown in FIG. 13, blank in a circular measurement is produced at the center of the pole figure. In order to resolve such blank in measurement produced at the center of the pole figure, the conventional method requires trial and error, and therefore a burden on the user becomes large.

SUMMARY OF THE INVENTION

The present invention has been made in consideration of such a situation, and has an object to provide a processing method, a processing apparatus and a processing program which can perform pole figure measurement continuously without overlapping of a tilt angle $\alpha$ with the small number of times of the $\beta$ scan, and enable efficient measurements.

(1) In order to accomplish the above-described object, the processing method of the present invention is a processing method for determining conditions of pole figure measurement by X-ray diffraction, including the steps of: receiving input of a diffraction angle $2\theta$; and determining an angle $\omega$ formed by an incident X-ray and an x-axis, and a tilt angle $\chi$ of a sample in each $\phi$ scan for a rotation angle $\phi$ within a sample plane so as to make a range of an angle $\alpha$ continuous from $\alpha=90°$ to $\alpha=0°$ without overlapping, the angle $\alpha$ being formed by the sample plane and a scattering vector, the range of the angle $\alpha$ are detectable at a time on a two-dimensional detection plane in the pole figure measurement at the diffraction angle $2\theta$, wherein determining the angle $\omega$ and the tilt angle $\chi$ is repeated.

Accordingly, the pole figure measurement can be performed continuously without overlapping of the angle $\alpha$ in the pole figure with the small number of times of the $\phi$ scan, thereby enabling the efficient measurements. Further, the measurement condition does not need to be determined, thereby reducing the burden on a user.

(2) Further, in the processing method of the present invention, the angle $\omega$ and the tilt angle $\chi$ in a first $\phi$ scan are determined so that one end of an arc representing the range of the angle $\alpha$ that is detectable at a time on the detection plane, when the rotation angle $\phi$ within the sample plane is set to be constant, comes in contact with a position at which the angle $\alpha$ is 90°. Accordingly, the detection is securely carried out when the angle $\alpha$ in the pole figure is 90°, and the center of the pole figure can be measured.

(3) Further, in the processing method of the present invention, the angle $\omega$ and the tilt angle $\chi$ in a second or subsequent $\phi$ scan are determined so that one end of an arc representing the range of the angle $\alpha$ detectable at a time on the detection plane, when the rotation angle $\phi$ is set to be constant, comes in contact with one end of an arc in an immediately preceding measurement stage. Therefore, the pole figure measurement can be performed in a short time by reduced number of φ scans, thereby enabling highly efficient measurements.

(4) Further, in the processing method of the present invention, the range of the angle α detectable at a time on the detection plane in each φ scan is preliminarily displayed, based on the determined angle ω and angle χ. Therefore, the range of the angle α in the each φ scan is visually understood, when carrying out the measurement under the measurement condition which has been set before the measurement. As a result, the measurement contents can be securely grasped, and the time taken for measuring can be estimated.

(5) Further, the processing apparatus of the present invention is a processing apparatus that determines conditions of pole figure measurement by X-ray diffraction, including: an input unit configured to receive input of a diffraction angle 2θ; a condition determination unit configured to determine an angle ω formed by an incident X-ray and an x-axis, and a tilt angle χ of a sample in each φ scan for a rotation angle φ within a sample plane so as to make a range of an angle α continuous from α=90° to α=0° without overlapping, the angle α being formed by the sample plane and a scattering vector, the range of the angle α are detectable at a time on a two-dimensional detection plane in the pole figure measurement at the diffraction angle 2θ; and a processing control unit configured to repeat determining the angle ω and the tilt angle χ. Therefore, the efficient measurement becomes possible, and the burden on a user is reduced.

(6) Further, the processing program of the present invention is a processing program for determining conditions of pole figure measurement by X-ray diffraction, the processing program causing a computer to execute the processes of: receiving input of a diffraction angle 2θ; and determining an angle ω formed by an incident X-ray and an x-axis, and a tilt angle χ of a sample in each φ scan for a rotation angle φ within a sample plane so as to make a range of an angle α continuous from α=90° to α=0° without overlapping, the angle α being formed by the sample plane and a scattering vector, the range of the angle α are detectable at a time on a two-dimensional detection plane in the pole figure measurement at the diffraction angle 2θ, wherein determining the angle ω and the tilt angle χ is repeated. Therefore, the efficient measurement becomes possible, and the burden on a user is reduced.

According to the present invention, the pole figure measurement can be performed continuously without overlapping of the angle α in the pole figure with the small number of times of the φ scan, thereby enabling efficient measurements. Further, the measurement condition does not need to be determined, thereby reducing the burden on a user.

BRIEF DESCRIPTION OF THE DRAWINGS

FIG. 10 is a diagram showing an example of an interface screen for displaying input and conditions.

DETAILED DESCRIPTION OF THE INVENTION

Figure 1:
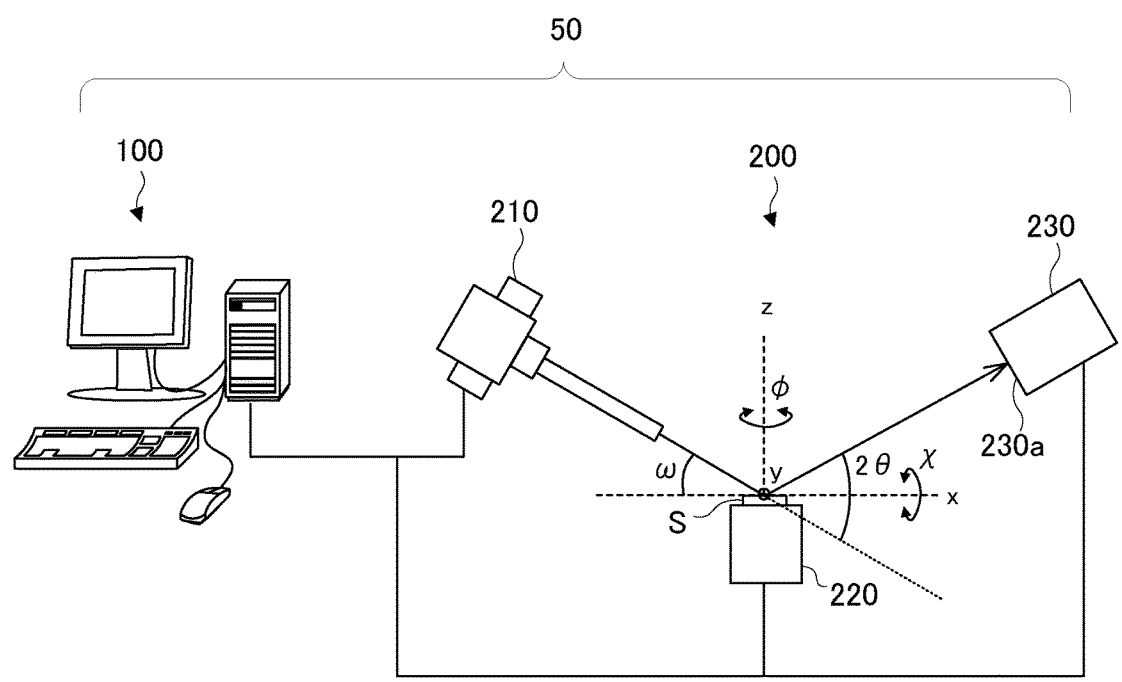
FIG. 1 is a schematic diagram showing the configuration of a pole figure measurement system of the present invention.

Next, the embodiments of the present invention will be explained while referring to the drawings. In order to facilitate understanding of explanation, in each drawing, the same reference numbers are used with respect to the same constituent elements, and duplicated explanation will be omitted.

[Configuration of System]

FIG. 1 is a schematic diagram showing the configuration of a pole figure measurement system 50. The pole figure measurement system 50 includes a processing apparatus 100 and a measuring apparatus 200. The processing apparatus 100, which is constituted by a PC, for example, determines the measurement condition; controls the measuring apparatus 200; and analyzes the measurement results. The measuring apparatus 200, which is constituted by an X-ray irradiation unit 210, a sample support unit 220, and a two-dimensional detector 230, detects a diffraction image in which incident X-rays irradiated by the X-ray irradiation unit 210 are diffracted by a sample S, using the two-dimensional detector 230.

The two-dimensional detector 230 can detect diffracted X-rays which are incident on a detection plane 230a. As shown in FIG. 1, the rotation of the sample support unit 220 is easy to be represented by taking a normal direction of the sample support plane as a z-axis, and setting orthogonal coordinates formed by an x-axis, a y-axis and a z-axis, in which the travel direction of the incident X-rays is included within the x-z plane.

The angle formed by the incident X-ray and the x-axis is expressed as ω, and the angle formed by the incident X-ray and the diffracted X-ray can be expressed as 2θ. When ω=0°, the incident X-ray travels toward the x-axis. The ω and 2θ can be set independently to each other.

The χ rotation means rotation of a sample S around the x-axis, and the rotation angle can be represented by χ. The φ rotation means rotation of the sample S around the normal line of the sample plane, and the rotation angle can be represented by φ. The rotation angle χ around the x-axis, the rotation angle ω around the y-axis, and the rotation angle φ around the normal line of the sample plane can be adjusted by the operation of the sample support unit 220.

The pole figure measurement system 50 enables efficient pole figure measurement using the two-dimensional detector 230. That is, the center of the pole figure can be measured, and a wide range of pole figure measurements at a time become possible by carrying out the measurement under the measurement condition which has been calculated by the processing apparatus 100, whereby the pole figure measurement can be performed efficiently in a short time. Further, the measurement condition is automatically calculated, and is set by the processing apparatus 100, and thus the pole figure measurement can be performed with a simple operation.

[Configuration of Processing Apparatus]

Figure 2:
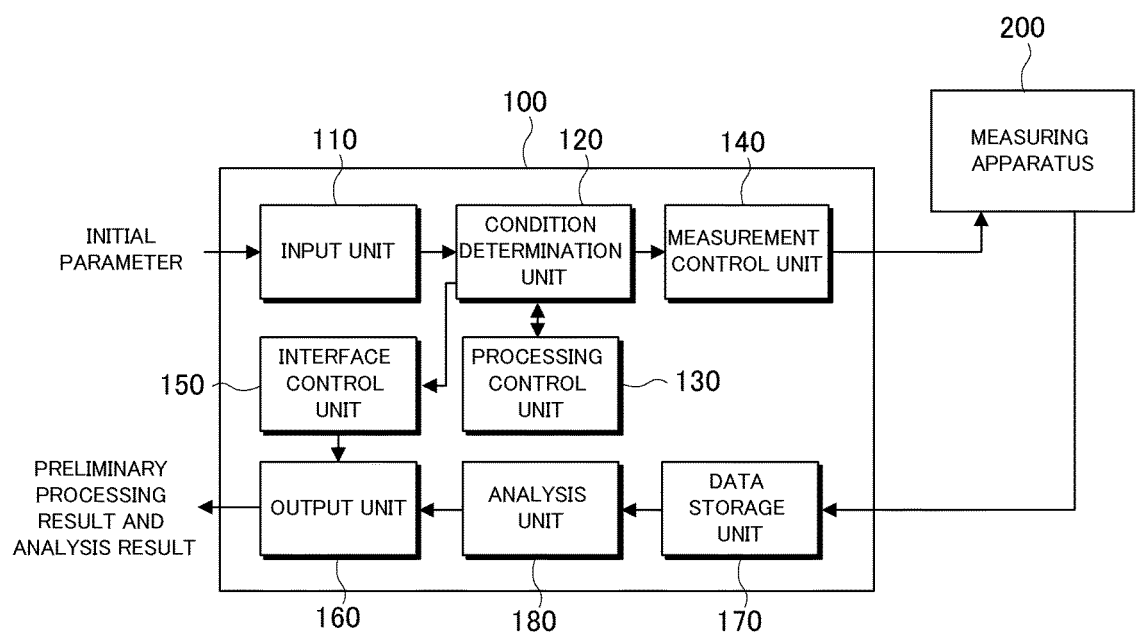
FIG. 2 is a block diagram showing the configuration of a processing apparatus of the present invention.

FIG. 2 is a block diagram showing the configuration of the processing apparatus 100. As shown in FIG. 2, the processing apparatus 100 includes an input unit 110, a condition determination unit 120, a processing control unit 130, a measurement control unit 140, an interface control unit 150, an output unit 160, a data storage unit 170, and an analysis unit 180.

The input unit 110 receives input from a user. For example, an input of the diffraction angle 2θ can be received in advance. In addition, an input of each of the distance from the sample S to the two-dimensional detector 230, and size of the detection plane 230*a* can also be received.

The condition determination unit 120 determines an angle ω formed by the x-axis and the incident X-ray, and a tilt angle χ of a sample in each φ scan for a rotation angle φ within a sample plane so as to make a range of an angle α continuous from α=90° to α=0° without overlapping, the angle α being formed by the sample plane and a scattering vector, the range of the angle α is detectable at a time on a two-dimensional detection plane 230*a* in the pole figure measurement at the diffraction angle 2θ. Being made continuous without overlapping means that as described later, one end of an arc representing the range of the angle α comes in contact with the center of the pole figure, or one ends of each of arcs representing the range of the angle α come in contact with each other when the φ rotation is carried out. In addition, the scattering vector is represented by $k_1-k_0$, with respect to a wave number vector $k_1$ of diffracted X-rays and a wave number vector $k_0$ of incident X-rays.

A wide range of pole figures can be measured via one-time scanning by carrying out the measurement in a state where the sample S to which the incident X-rays and the diffracted X-rays are arranged symmetrical is tilted in the χ direction. In that case, the center of the pole figure cannot be measured as it is because the incident angle is changed, thus the center of the pole figure can be measured by tilting the sample S to the incidence side, that is, by shifting ω (as a value larger than a half of 2θ) to set an asymmetrical arrangement. Accordingly, the pole figure measurement can be performed continuously without overlapping of the range of α in the pole figure, and the pole figure can be measured with the small number of times of the φ scan, thereby enabling the efficient measurements. Further, the measurement condition does not need to be determined, thereby reducing the burden on a user.

Figure 3A:
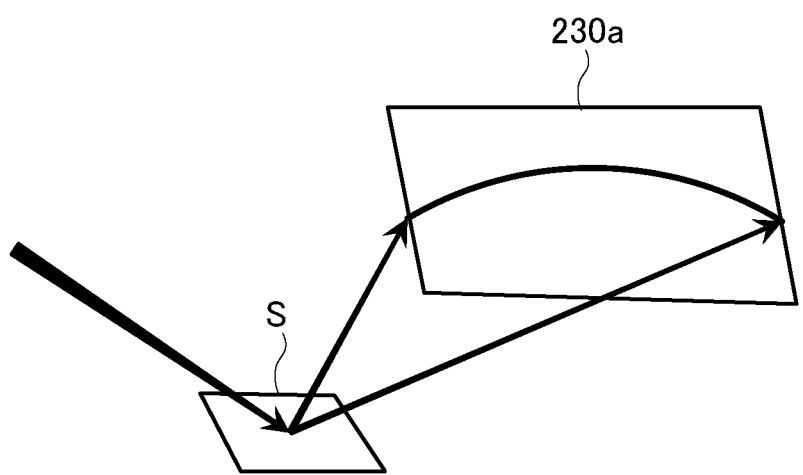
FIGS. 3A and 3B are diagrams each showing the arrangement of a sample with a two-dimensional detector, and the range which is detectable at a time.
Figure 3B:
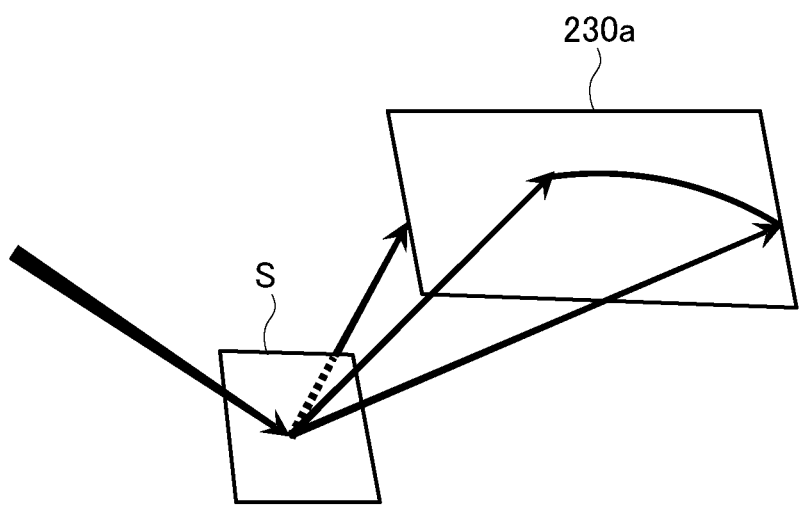

FIGS. 3A and 3B are diagrams each showing the arrangement of a sample with a two-dimensional detector 230, and the range which is detectable at a time. As shown in FIG. 3A, the range of α captured on the detection plane 230*a* can be measured at a time by using the two-dimensional detector 230.

Figure 4:
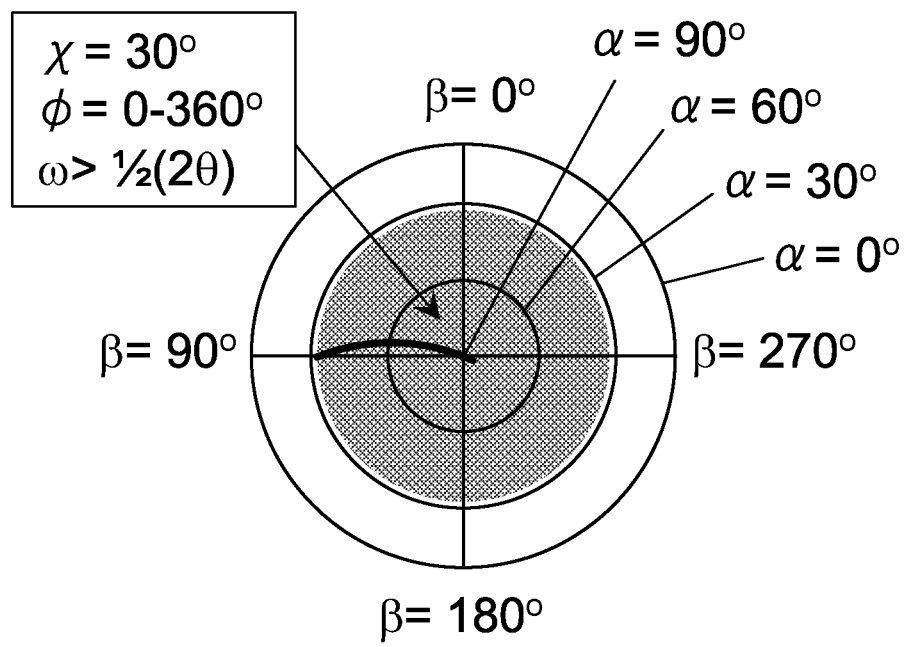
FIG. 4 is a diagram representing the range which is detectable by the first φ scan on a pole figure.

FIG. 4 is a diagram representing the range which is detectable by the first φ scan on the pole figure. The entire range of the pole figure can be provided by measuring φ while varying χ, however as shown in FIG. 3B, the measurable range is changed by χ, because there is a shadow part of the sample S. Taking into account the shadow part, the position of χ in the second or subsequent scan is calculated, thereby enabling the highly efficient measurement without overlapping.

Specifically, the angle ω and the angle χ in the first φ scan are first determined so that one end of an arc representing the range of α detectable at a time on the detection plane, when the rotation angle φ within the sample plane is set to be constant, comes in contact with the position at which α is 90°. Accordingly, the detection is securely carried out when α in the pole figure is 90°, and the center of the pole figure can be measured. In addition, the case where overlapping is made within 1° for α or 20 pixels is included in that one end of an arc representing the range of α comes in contact with the position at which α is 90°. In the case of one end of an arc representing the range of α, there is a case where pixels expected to be in a detection range partly cut off because of a detection frame, and thus a certain amount of extension of the overlapping as described above becomes necessary.

Then, ω and χ in the second or subsequent φ scan are determined so that one end of an arc representing the range of α detectable at a time on the detection plane when φ is set to be constant comes in contact with one end (to take FIG. 4 as an example, the end portion of the circular dark color region) at a time when an arc in an immediately preceding measurement stage is rotated φ rotation. Accordingly, the pole figure measurement can be performed in a short time by reduced φ scan, thereby enabling highly efficient measurements. A method for calculating ω and χ will be detailed later. The contact state in this case also includes the case where overlapping is made within 1° for α or 20 pixels.

Determining ω and χ with the condition determination unit 120 is repeated by the processing control unit 130. As a result of this, the range of α at each step of χ can be determined. When satisfying the predetermined conditions, repeating thereof is ended. As a result, for example, χ and ω can be determined so that the measurement can be carried out by three times of χ steps, though conventionally four times of χ steps need to be determined.

The measurement control unit 140 performs the pole figure measurement based on the determined measurement condition. For example, in a case where three times of φ scans are required at a different tilt angle α, y-axis and x-axis rotation movements of the sample S are carried out for ω and χ which have been determined with respect to each φ scan. Then, the φ scan is carried out by making one rotation around a normal axis of the sample plane while irradiating the sample S with X-rays.

The interface control unit 150 controls the interface for confirming an input interface and determination results which are provided to a user. For example, the range of α which is detectable at a time on the detection plane in each φ scan, based on ω and χ which have been determined, is displayed in advance. Thereby, it is possible to visually understand the range of α in each φ scan when carrying out the measurement under the measurement condition which has been set before the measurement. As a result, the measurement contents can be securely grasped, and the time taken for measuring can be estimated. In that case, it is preferable that the pole figure measured under the calculated conditions is illustrated. Whether the seeking measurement is possible or not under the conditions which have been set can be judged by illustrating the pole figure which is measured under the calculated measurement condition.

The output unit 160 outputs the interface and so forth for confirming determination results of input and a measurement condition. For example, screen display of the input interface is performed on a display. The display example of an interface screen will be mentioned below. Further, the output unit 160 can also analyze the measurement results of diffracted X-rays and display them.

The data storage unit 170 stores measurement results obtained by the measuring apparatus 200. That is, intensity of X-rays detected by the two-dimensional detector 230 via each φ scan is stored. The analysis unit 180 analyzes X-ray intensity which has been stored to provide the pole figure. Further, orientation of the sample S may be able to be calculated by the resulting pole figure.

[Operation of Processing Apparatus]

Figure 5:
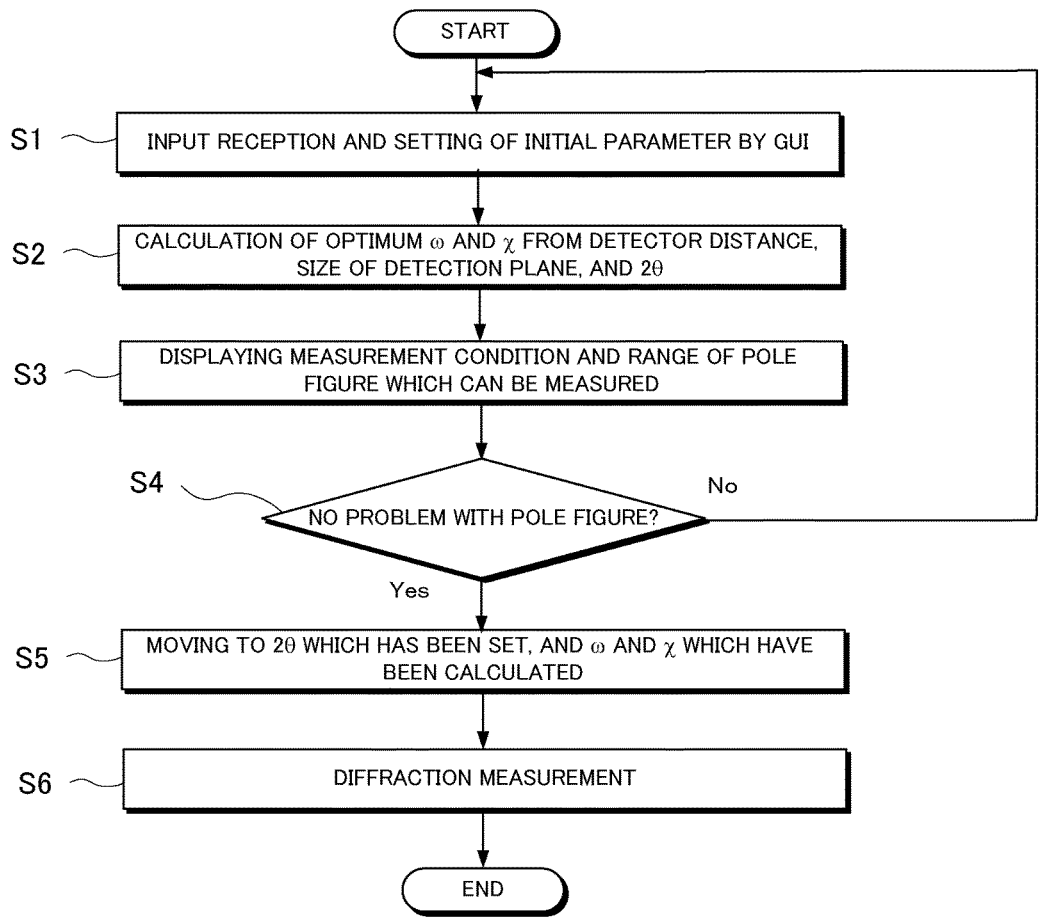
FIG. 5 is a flowchart showing the basic operation of the pole figure measurement system of the present invention.

Next, the operation of the pole figure measurement system 50 constituted as described above will be described. FIG. 5 is a flowchart showing the basic operation of the pole figure measurement system 50. First, the input of the initial parameter is received by GUI (step S1). Specifically, the input of a diffraction angle 2θ to be measured is received to be set as an initial value. The diffraction angle 2θ is calculated from a material and a measurement index, and may be set as the initial value. As to the distance from the sample S to the detection plane 230a, in a case where a value which has been set in the measuring apparatus 200 is maintained, the value may be used. In a case where an input from a user may be received. In a case where no input is received from a user, it is preferable that the position of the detector from the current apparatus state is used. The measurement range of the pole figure has been given by default settings, and thus the parameter which has to be decided at least by a user is only the diffraction angle 2θ.

Next, optimum ω and χ are calculated based on the distance from the held sample S to the detection plane 230a, size of the detection plane 230a, and 2θ (step S2). The type of the two-dimensional detector 230 can be recognized by the processing apparatus 100, thereby also enabling acquisition of the size of the detection plane 230a. In addition, the specific calculation method will be mentioned below.

The measurement conditions such as ω, χ and so forth which have been calculated, and the range of the pole figure which can be measured at each χ are displayed (step S3); user's input is received; and whether or not it is determined that there is no problem is judged (step S4). Confirmation and judgement by a user are facilitated by illustration of the measurable pole figure.

In a case where it is judged by a user that there is a problem, processing returns to step S1. In a case where it is judged that there is no problem, the measuring apparatus 200 is controlled under the determined measurement condition, and the sample S is moved to the position of 2θ which has been set, and each of ω and χ which has been calculated (step S5). The φ scan with respect to each χ step is carried out to execute the diffraction measurement (step S6). In addition, GUI will be detailed later.

[Calculation of ω and χ]

Next, in the above-described operations, the operation concerning calculating of ω and χ by the processing apparatus 100 will be described. First, the definition of each symbol will be described.

(Definition of Symbol)

Figure 7:
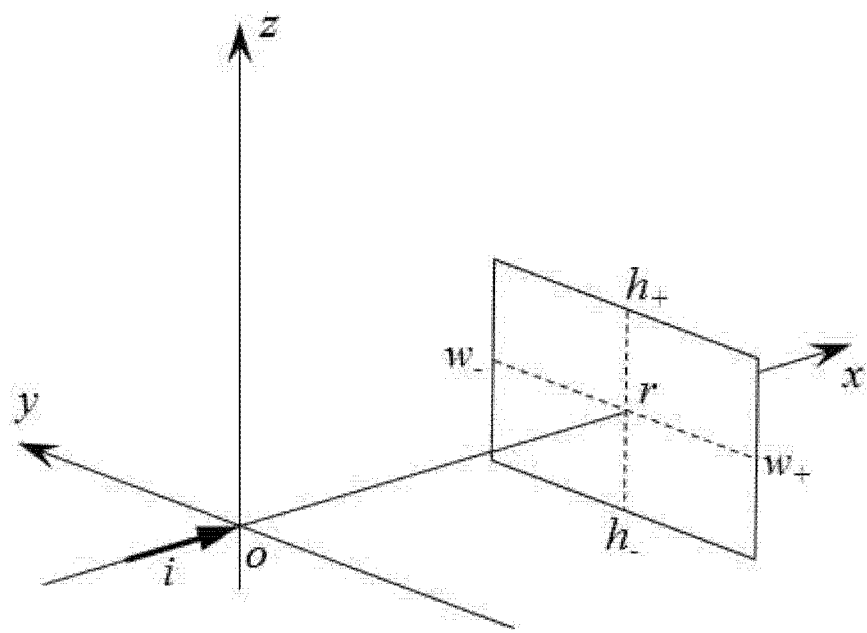
FIG. 7 is a diagram showing a measurement system coordinate with a sample as the center.

FIG. 7 is a diagram showing a measurement system coordinate. The unit vector i of incident X-rays can be defined by formula (1).

$$i = \begin{pmatrix} 1 \\ 0 \\ 0 \end{pmatrix} \quad (1)$$

The unit vector $i_\omega$ which is obtained by rotating i around y-axis by ω is represented by formula (2).

$$i_\omega = \begin{pmatrix} \cos\omega & 0 & \sin\omega \\ 0 & 1 & 0 \\ -\sin\omega & 0 & \cos\omega \end{pmatrix} \begin{pmatrix} 1 \\ 0 \\ 0 \end{pmatrix} = \begin{pmatrix} \cos\omega \\ 0 \\ -\sin\omega \end{pmatrix} \quad (2)$$

A point of the intersection of a detection plane with a normal line of the detection plane passing through the origin o is represented by r, and the distance from the origin o to the detection plane is represented by L (L is equal to the distance between the origin o and the point r). When ω=2, and θ=0, the point r is positioned on the x-axis.

The detection plane is assumed to be rotated by each of ω and a diffraction angle 2θ. A rotation matrix $R_{\omega,2\theta}$ in this case is represented by formula (3).

$$R_{\omega,2\theta} = \begin{pmatrix} \cos(\omega - 2\theta) & 0 & \sin(\omega - 2\theta) \\ 0 & 1 & 0 \\ -\sin(\omega - 2\theta) & 0 & \cos(\omega - 2\theta) \end{pmatrix} \quad (3)$$

In a case where the detection plane is rectangle and arranged as shown in FIG. 7, size in the y-axis direction and size in the z-axis direction are represented by $w_+$ and $w_-$, and $h_+$ and $h_-$, respectively, as shown in formula (4). In addition, it is preferable for the purpose of calculation that the detection plane is rectangle like the example shown in FIG. 7, however, it may be circular or elliptical, and may be in any shape. The range of α detectable at a time is different therefrom according to a shape, and thus the shape may be taken into account for the purpose of calculation.

$W_+$: Distance between point r and point $w_+$ $W_-$: Distance between point r and point $w_-$ $H_+$: Distance between point r and point $h_+$ $H_-$: Distance between point r and point $h_-$ (4)

Figure 8A:
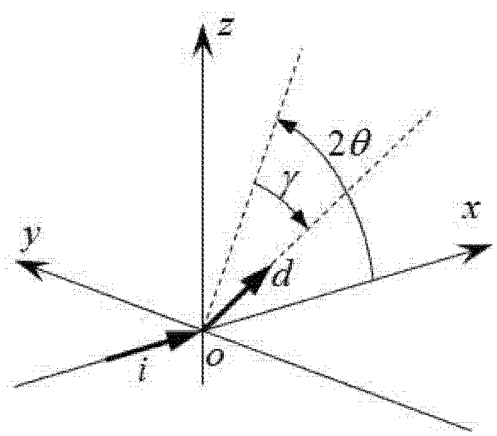
FIGS. 8A to 8D are diagrams each showing a measurement system coordinate with a sample as the center.

FIGS. 8A to 8D are diagrams each showing a measurement system coordinate with a sample as the center. When incident X-rays i are diffracted at the diffraction angle 2θ at the origin, the unit vector of diffracted X-rays is represented by d. That is, as shown in FIG. 8A, the unit vector d of diffracted X-rays in which X-rays diffracted at the diffraction angle 2θ within the x-y plane in the direction of z>0 rotate around incident X-rays i serving as an axis by γ is represented by formula (5).

$$d = \begin{pmatrix} 1 & 0 & 0 \\ 0 & \cos\gamma & -\sin\gamma \\ 0 & \sin\gamma & \cos\gamma \end{pmatrix} \begin{pmatrix} \cos 2\theta & 0 & -\sin 2\theta \\ 0 & 1 & 0 \\ \sin 2\theta & 0 & \cos 2\theta \end{pmatrix} \begin{pmatrix} 1 \\ 0 \\ 0 \end{pmatrix} \quad (5)$$

Further, when incident X-rays $i_\omega$ are diffracted at the diffraction angle 2θ at the origin, the unit vector of diffracted X-rays is represented by formula (6).

$$d_\omega = \begin{pmatrix} \cos\omega & 0 & \sin\omega \\ 0 & 1 & 0 \\ -\sin\omega & 0 & \cos\omega \end{pmatrix} \begin{pmatrix} 1 & 0 & 0 \\ 0 & \cos\gamma & -\sin\gamma \\ 0 & \sin\gamma & \cos\gamma \end{pmatrix} \begin{pmatrix} \cos 2\theta & 0 & -\sin 2\theta \\ 0 & 1 & 0 \\ \sin 2\theta & 0 & \cos 2\theta \end{pmatrix} \begin{pmatrix} 1 \\ 0 \\ 0 \end{pmatrix} \quad (6)$$

Figure 8B:
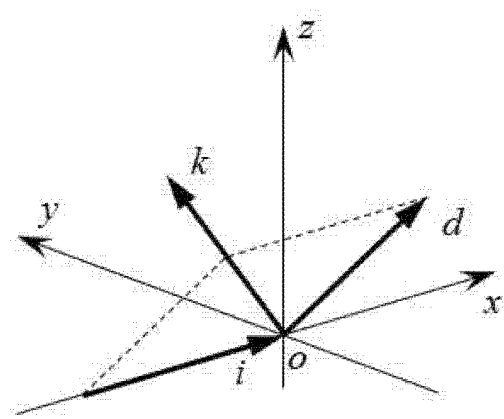

As shown in FIG. 8B, the unit vector k of the diffraction vector, which is represented by incident X-rays i and diffracted X-rays d, is represented by formula (7).

$$k = \frac{d-i}{|d-i|} \quad (7)$$

Figure 8C:
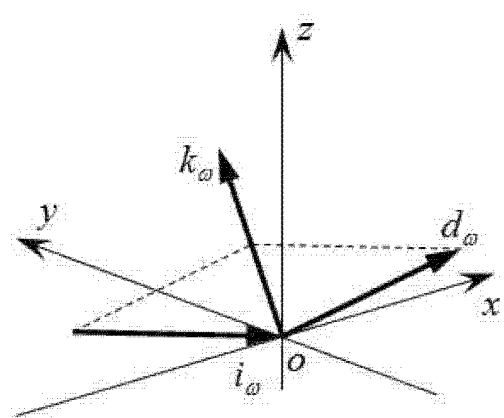

Further, as shown in FIG. 8C, the unit vector $k_\omega$ of the diffraction vector, which is represented by incident X-rays $i_\omega$ and diffracted X-rays $d_\omega$, is represented by formula (8).

$$k_\omega = \frac{d_\omega - i_\omega}{|d_\omega - i_\omega|} = \begin{pmatrix} \cos\omega & 0 & \sin\omega \\ 0 & 1 & 0 \\ -\sin\omega & 0 & \cos\omega \end{pmatrix} k \quad (8)$$

The unit normal vector s on the sample plane of a flat sample S is represented by formula (9).

$$s = \begin{pmatrix} 0 \\ 0 \\ 1 \end{pmatrix} \quad (9)$$

Figure 8D:
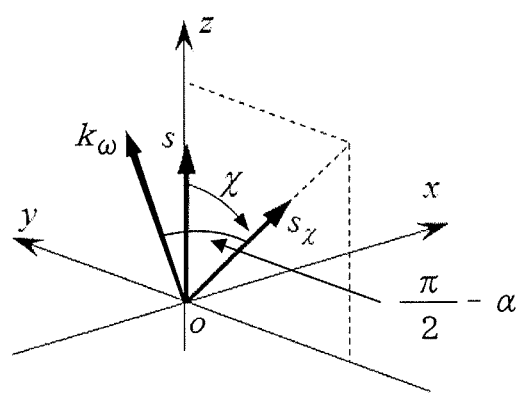
Figure 9A:
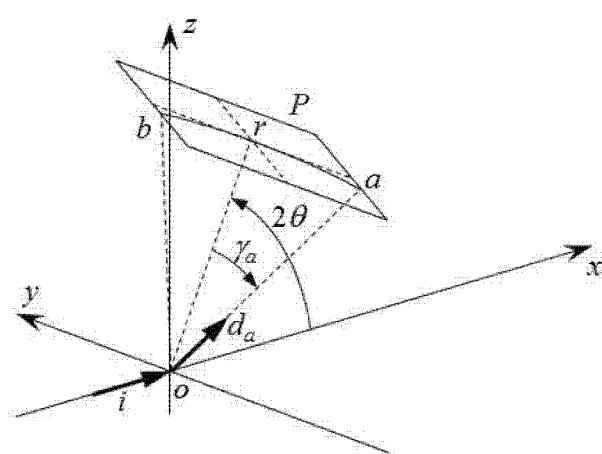
FIGS. 9A to 9D are diagrams each showing the arrangement of a sample with a two-dimensional detector, and the range which is detectable at a time.
Figure 9B:
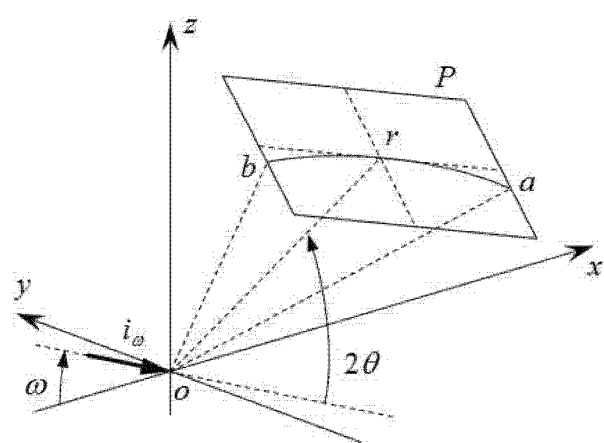
Figure 9C:
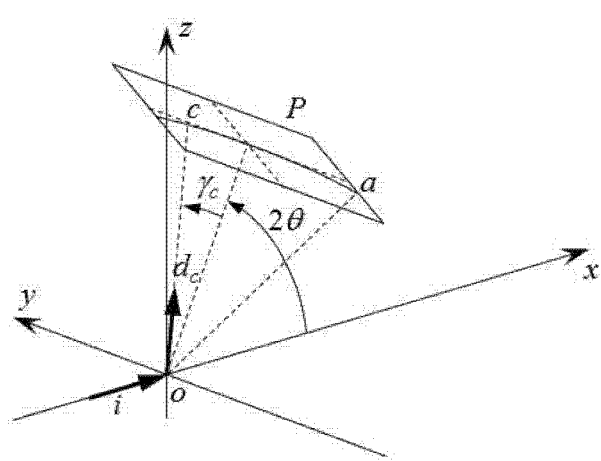
Figure 9D:
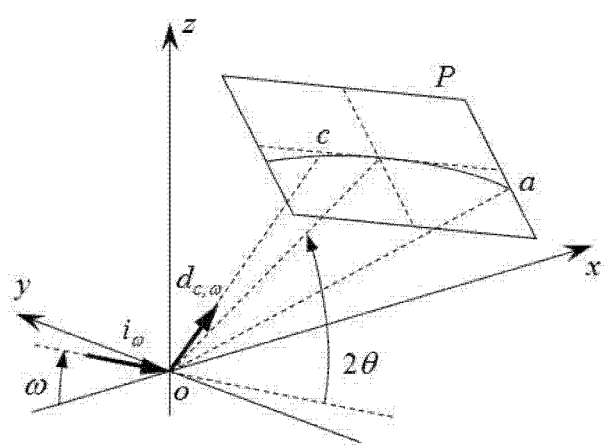
Figure 11A:
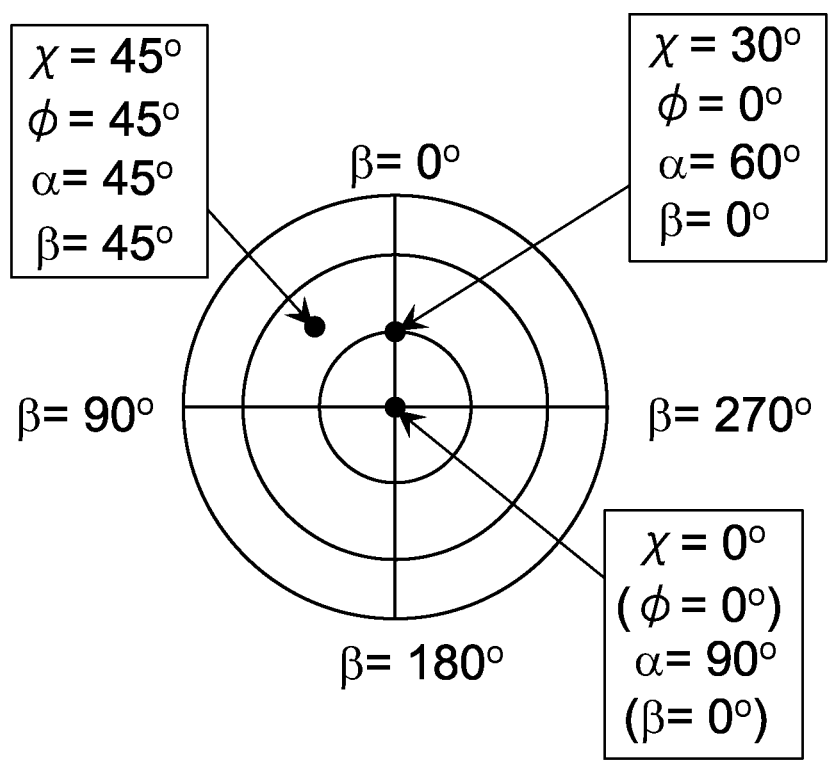
FIGS. 11A and 11B are diagrams showing the detection ranges when β via a zero-dimensional detector and a two-dimensional detector, respectively, is set to be constant.
Figure 11B:
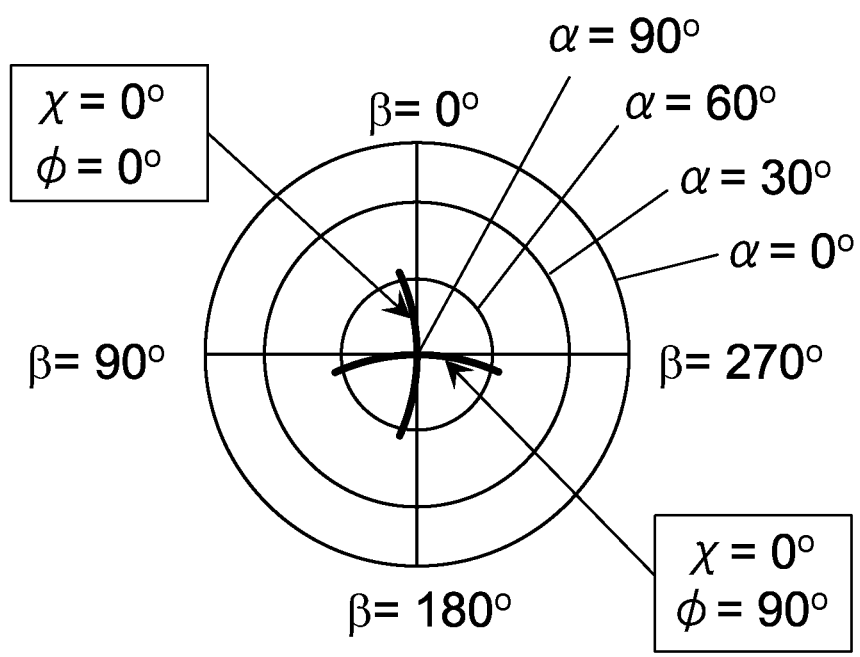
Figure 12A:
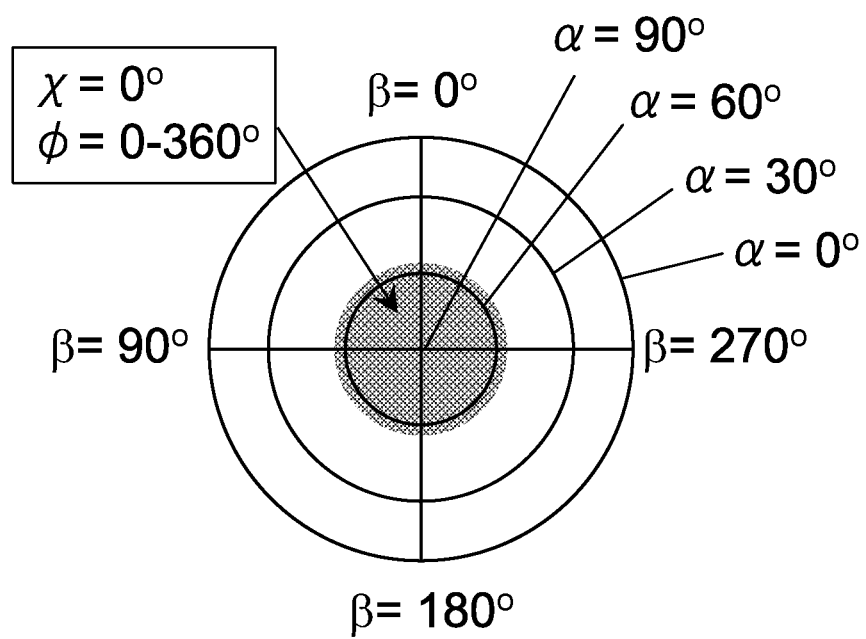
FIGS. 12A and 12B are diagrams showing the ranges of φ scan when χ=0° and when χ is varied in a stepwise manner, respectively.
Figure 12B:
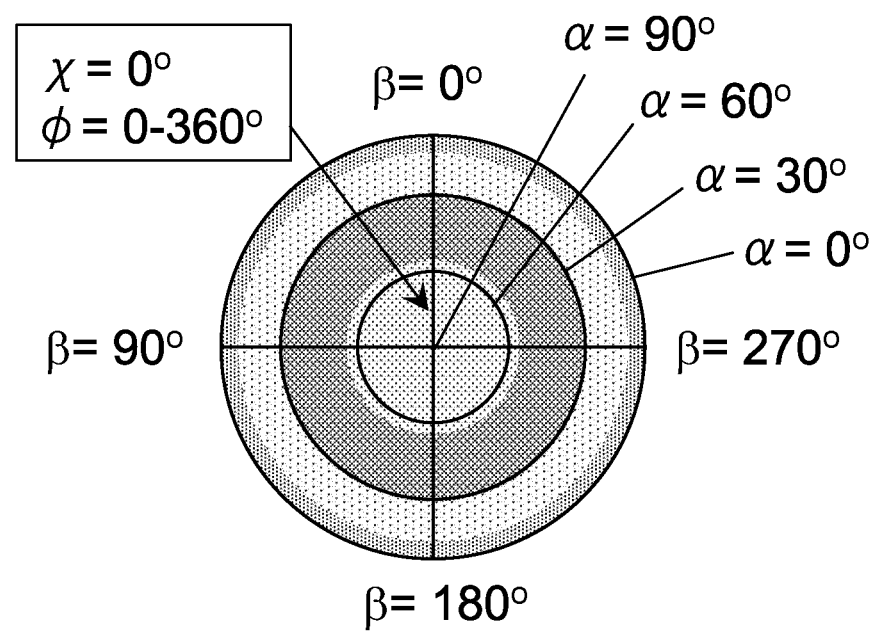
Figure 13:
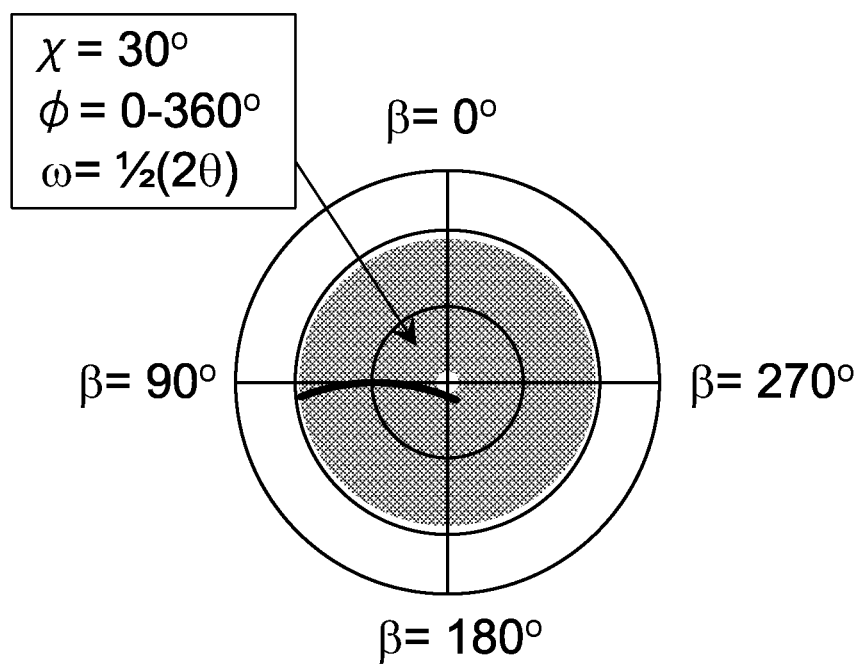
FIG. 13 is a diagram showing the detection range when tilting a sample to set χ as an angle of 30°, and carrying out φ scan.

As shown in FIG. 8D, the unit normal vector $s_\chi$ on the sample plane, which rotates s around the x-axis by $\chi$ is represented by formula (10).

$$s_\chi = \begin{pmatrix} 1 & 0 & 0 \\ 0 & \cos\chi & -\sin\chi \\ 0 & \sin\chi & \cos\chi \end{pmatrix} s \quad (10)$$

The angle $\Psi_k$ formed by the normal line of the sample plane and the diffraction vector is represented by formula (11).

$$\Psi_k = \cos^{-1}(s_\chi \cdot k_\omega) \quad (11)$$

The rotation around the normal line of the sample plane serving as an axis is set to β.

(Processing Content)

Figure 6:
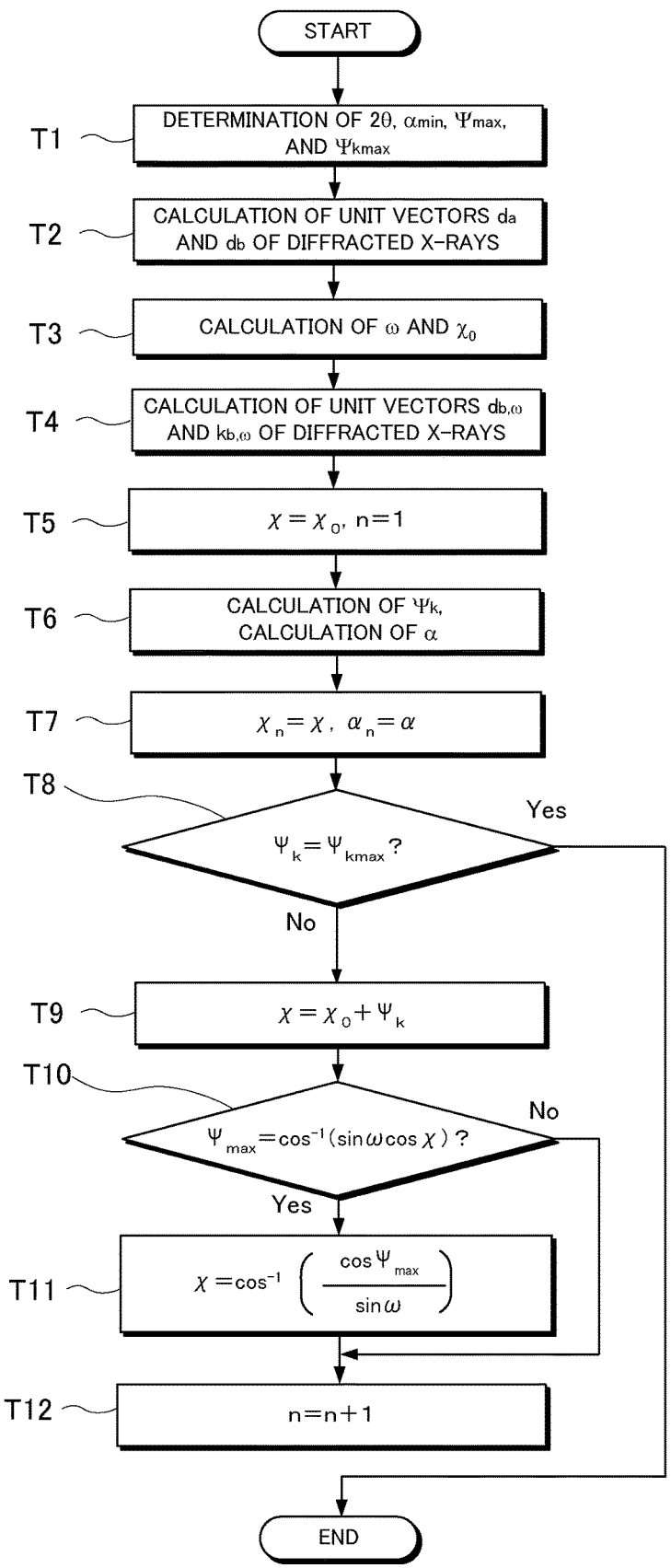
FIG. 6 is a flowchart showing the operation of the processing apparatus of the present invention.

Calculation is carried out based on the definition as described above. FIG. 6 is a flowchart showing the operation of the processing apparatus 100. First, 2θ, $\alpha_{min}$, $\Psi_{max}$, and $\Psi_{kmax}$ are determined (step T1). That is, 2θ which depends on a sample and plane indices to be measured, and the minimum value $\alpha_{min}$ in the range of α to be measured are first determined. The $\alpha_{min}$ determines an arbitrary value under $0 \le \alpha_{min} \le \pi/2$.

Then, the maximum value $\Psi_{kmax}$ of the angle formed by the unit normal vector $s_\chi$ of the sample plane and the diffraction vector can be calculated by formula (12).

$$\Psi_{kmax} = \frac{\pi}{2} - \alpha_{min} \quad (12)$$

The maximum value $\Psi_{max}$ of the angle formed by the unit normal vector $s_\chi$ of the sample plane and each of incident X-rays and diffracted X-rays can be calculated by formula (13).

$$\Psi_{max} = \cos^{-1}(\sin\theta \cos\Psi_{k\,max}) \quad (13)$$

Next, the unit vectors $d_a$ and $d_b$ of diffracted X-rays will be calculated (step T2). First, $d_a$ will be calculated. The unit vector d of diffracted X-rays when incident X-rays i have been diffracted at the diffraction angle 2θ at the origin o is represented by formula (14).

$$d = \begin{pmatrix} \cos 2\theta \\ -\sin 2\theta \sin\gamma \\ \sin 2\theta \cos\gamma \end{pmatrix} \quad (14)$$

Formula (15) represents an equation of the detection plane.

$$x + (\tan 2\theta)z = \frac{L}{\cos 2\theta} \quad (15)$$

When Pd (p being any number) indicates a point within the detection plane, formula (16) is established.

$$p = \frac{L}{\cos^2 2\theta + \sin^2 2\theta \cos\gamma} \quad (16)$$

In the range of $0 \le \gamma \le \pi$, the y component of pd y(pd) always becomes a value of 0 or less as shown in formula (17).

$$y(pd) = \frac{L}{\cos^2 2\theta + \sin^2 2\theta \cos\gamma}(-\sin 2\theta \sin\gamma) \quad (17)$$

Then, the minimum value $y(pd)_{min}$ of y(pd) is represented by formula (18).

$$y(pd)_{min} = \begin{cases} -\frac{|L\tan 2\theta|}{\sqrt{1-\tan^2 2\theta}} & 0 \le 2\theta < \frac{\pi}{4}, \frac{3\pi}{4} < 2\theta \le \pi \\ -\infty & \frac{\pi}{4} < 2\theta \le \frac{3\pi}{4} \end{cases} \quad (18)$$

Size of the detection plane is limited. In the range, the point within the detection plane, which pd indicates when y(pd) becomes minimal, is represented by a. Further, γ in the case pd indicates the point a is represented by $\gamma_a$. From formula (19), $\gamma_a$ in the case $y(pd)_{min} = -W_+$ is established can be calculated.

$$\gamma_a = \sin^{-1}\left(\frac{W_+ \cos^2 2\theta}{\sqrt{L^2 + W_+^2 \sin^2 2\theta \sin 2\theta}}\right) - \tan^{-1}\left(\frac{W_+ \sin 2\theta}{L}\right) \quad (19)$$

On the other hand, x(pd) is represented by formula (20).

$$x(pd) = \frac{L}{\cos^2 2\theta + \sin^2 2\theta \cos\gamma_a} \cos 2\theta \quad (20)$$

The range of x(pd) can be calculated as shown in formula (21) from each of $H_-$ and $H_+$ in size of the detector.

$$\begin{cases} x(pd) \le L\cos2\theta + H_-\sin2\theta & \text{when } 2\theta \le \dfrac{\pi}{2} \\ x(pd) > L\cos2\theta - H_+\sin2\theta & \text{when } 2\theta > \dfrac{\pi}{2} \end{cases} \quad (21)$$

In addition, when formula (22) is satisfied, the calculation can be carried out as shown in formula (23).

$$\dfrac{L}{\cos^2 2\theta + \sin^2 2\theta \cos\gamma_a}\cos2\theta \le L\cos2\theta + H_-\sin2\theta \left(2\theta \le \dfrac{\pi}{2}\right) \quad (22)$$

$$\gamma_a = \cos^{-1}\left(\dfrac{L}{\sin^2 2\theta(L + H_-\tan2\theta)} - \dfrac{1}{\tan^2 2\theta}\right) \quad (23)$$

On the other hand, when formula (24) is satisfied, the calculation can be carried out as shown in formula (25).

$$\dfrac{L}{\cos^2 2\theta + \sin^2 2\theta \cos\gamma_a}\cos2\theta > L\cos2\theta - H_+\sin2\theta \left(2\theta > \dfrac{\pi}{2}\right) \quad (24)$$

$$\gamma_a = \cos^{-1}\left(\dfrac{L}{\sin^2 2\theta(L - H_+\tan2\theta)} - \dfrac{1}{\tan^2 2\theta}\right) \quad (25)$$

Practically, both of the ranges limited by $W_+$, $W_-$ and $H_+$, $H_-$ need to be satisfied, and thus a smaller $\gamma_a$ between formula (19) and formula (23) or (25) is used to calculate $d_a$ as described in formula (26).

$$d_a = \begin{pmatrix} \cos2\theta \\ -\sin2\theta\sin\gamma_a \\ \sin2\theta\cos\gamma_a \end{pmatrix} \quad (26)$$

Next, the unit vector $d_b$ of diffracted X-rays will be calculated. When qd (q being any number) indicates a point within the detection plane, formula (27) is established.

$$q = \dfrac{L}{(\cos2\theta + \sin2\theta\cos\gamma\tan2\theta)\cos2\theta} = \dfrac{L}{\cos^2 2\theta + \sin^2 2\theta\cos\gamma} \quad (27)$$

In the range of $-\pi \le \gamma \le 0$, the y component of qd y(pd) is represented by formula (28), and always takes a value of 0 or more.

$$y(qd) = \dfrac{L}{\cos^2 2\theta + \sin^2 2\theta\cos\gamma}(-\sin2\theta\sin\gamma) \quad (28)$$

The maximum value $y(qd)_{max}$ of y(pd) is given as shown in formula (29).

$$y(qd)_{max} = \begin{cases} \dfrac{|L\tan2\theta|}{\sqrt{1-\tan^2 2\theta}} & 0 \le 2\theta < \dfrac{\pi}{4}, \dfrac{3\pi}{4} < 2\theta \le \pi \\ \infty & \dfrac{\pi}{4} < 2\theta \le \dfrac{3\pi}{4} \end{cases} \quad (29)$$

Size of the detection plane is limited. In the range, the point within the detection plane, which qd indicates when y(qd) becomes maximal, is represent by b. Further, $\gamma$ in the case qd indicates the point b is represented by $\gamma_b$. From formula (30), $\gamma_b$ in the case $y(qd)_{max}=W_-$ is established can be calculated.

$$\gamma_b = \sin^{-1}\left(-\dfrac{W_-\cos^2 2\theta}{\sqrt{L^2 + W_-^2\sin^2 2\theta\sin2\theta}}\right) - \tan^{-1}\left(\dfrac{W_-\sin2\theta}{L}\right) \quad (30)$$

On the other hand, x(qd) is represented as shown in formula (31).

$$x(qd) = \dfrac{L}{\cos^2 2\theta + \sin^2 2\theta\cos\gamma_b}\cos2\theta \quad (31)$$

The range of x(qd) is represented as shown in formula (32) from each of $H_-$ and $H_+$ in size of the detector.

$$\begin{cases} x(qd) \le L\cos2\theta + H_-\sin2\theta & \text{when } 2\theta \le \dfrac{\pi}{2} \\ x(qd) > L\cos2\theta - H_+\sin2\theta & \text{when } 2\theta \le \dfrac{\pi}{2} \end{cases} \quad (32)$$

When formula (33) is satisfied, formula (34) is established.

$$\dfrac{L}{\cos^2 2\theta + \sin^2 2\theta\cos\gamma_b}\cos2\theta \le L\cos2\theta + H_-\sin2\theta \left(2\theta \le \dfrac{\pi}{2}\right) \quad (33)$$

$$\gamma_b = -\cos^{-1}\left(\dfrac{L}{\sin^2 2\theta(L + H_-\tan2\theta)} - \dfrac{1}{\tan^2 2\theta}\right) \quad (34)$$

On the other hand, when formula (35) is satisfied, formula (36) is established.

$$\dfrac{L}{\cos^2 2\theta + \sin^2 2\theta\cos\gamma_b}\cos2\theta > L\cos2\theta - H_+\sin2\theta \left(2\theta > \dfrac{\pi}{2}\right) \quad (35)$$

$$\gamma_b = -\cos^{-1}\left(\dfrac{L}{\sin^2 2\theta(L - H_+\tan2\theta)} - \dfrac{1}{\tan^2 2\theta}\right) \quad (36)$$

Practically, both of the ranges limited by $W_+$, $W_-$, $H_+$ and $H_-$ need to be satisfied, and thus a larger $\gamma b$ is used to calculate db. Then, $d_b$ is calculated from the resulting $\gamma_b$ as shown in formula (37).

$$d_b = \begin{pmatrix} \cos2\theta \\ -\sin2\theta\sin\gamma_b \\ \sin2\theta\cos\gamma_b \end{pmatrix} \quad (37)$$

Next, $\omega$ and $\chi_0$ will be calculated (step T3). The unit vector $k_a$ of the diffraction vector of diffracted X-rays which have been detected at the point a within a plane of the detector is represented by formula (38).

$$k_a = \frac{d_a - i}{|d_a - i|} \equiv \begin{pmatrix} x(k_a) \\ y(k_a) \\ z(k_a) \end{pmatrix} \quad (38)$$

In order to move $k_a$ in the y-z plane, the whole is rotated only by ω. The ω in this case can be calculated by formula (39).

$$\omega = \tan^{-1}\left(-\frac{x(k_a)}{z(k_a)}\right) \quad (39)$$

Further, the diffraction vector $k_{a,\omega}$ which is tilted at ω can be calculated by formula (40).

$$k_{a,\omega} = \begin{pmatrix} \cos\omega & 0 & \sin\omega \\ 0 & 1 & 0 \\ -\sin\omega & 0 & \cos\omega \end{pmatrix} k_a \equiv \begin{pmatrix} x(k_{a,\omega}) \\ y(k_{a,\omega}) \\ z(k_{a,\omega}) \end{pmatrix} \quad (40)$$

$\chi_0$ in the case the orientation of $k_{a,\omega}$ is identical to the vector orientation when the unit vector of the z-axis is rotated around the x-axis by $\chi_0$ can be calculated by formula (41).

$$\chi_0 = \tan^{-1}\left(-\frac{y(k_{a,\omega})}{z(k_{a,\omega})}\right) \quad (41)$$

When carrying out the measurement at ω and $\chi_0$ which have been obtained, diffracted X-rays having a normal line of the sample plane as a diffraction vector is detected at the point a within the detection plane.

Next, $d_{b,\omega}$ and $k_{b,\omega}$ are calculated by formulae (42) and (43) (step T4).

$$d_{b,\omega} = \begin{pmatrix} \cos\omega & 0 & \sin\omega \\ 0 & 1 & 0 \\ -\sin\omega & 0 & \cos\omega \end{pmatrix} \begin{pmatrix} \cos2\theta \\ -\sin2\theta\sin\gamma_b \\ \sin2\theta\cos\gamma_b \end{pmatrix} \quad (42)$$

$$k_b = \frac{d_b - i}{|d_b - i|} \quad (43)$$

$$k_{b,\omega} = \begin{pmatrix} \cos\omega & 0 & \sin\omega \\ 0 & 1 & 0 \\ -\sin\omega & 0 & \cos\omega \end{pmatrix} k_b$$

Then, initial values of χ and n are set by formula (44) (step T5).

$$\chi = \chi_0$$
$$n = 1 \quad (44)$$

Next, the measurement condition will be determined. FIGS. 9A to 9D are diagrams each showing the arrangement of a sample with a two-dimensional detector, and the range which is detectable at a time. First, $\Psi_k$ and α will be calculated (step T6). When calculating $\Psi_k$, in the case of incident X-rays $i_w$ and the normal line $s_\chi$ of the sample plane, formula (45) needs to be established in order that the unit vector $d_{b,\omega}$ of diffracted X-rays may satisfy the appropriate measurement condition.

$$\cos\Psi_{max} \leq d_{b,\omega} \cdot s_\chi \quad (45)$$

When this condition is not satisfied, diffracted X-rays $d_{b,\omega}$ almost pass through the sample plane, or pass through the sample. When no appropriate measurement condition is satisfied, $d_{c,\omega}$ that satisfies formula (46) is determined.

$$\cos\Psi_{max} = d_{c,\omega} \cdot s_\chi \quad (46)$$

The unit vector $d_c$ of diffracted X-rays which are diffracted at a diffracted angle 2θ at the point o, and detected at the point c within a detection plane can be calculated by formula (47).

$$d_c = \begin{pmatrix} 1 & 0 & 0 \\ 0 & \cos\gamma_c & -\sin\gamma_c \\ 0 & \sin\gamma_c & \cos\gamma_c \end{pmatrix} \begin{pmatrix} \cos2\theta & 0 & -\sin2\theta \\ 0 & 1 & 0 \\ \sin2\theta & 0 & \cos2\theta \end{pmatrix} \begin{pmatrix} 1 \\ 0 \\ 0 \end{pmatrix} = \begin{pmatrix} \cos2\theta \\ -\sin2\theta\sin\gamma_c \\ \sin2\theta\cos\gamma_c \end{pmatrix} \quad (47)$$

The diffraction vector $d_{c,\omega}$ that has tilted $d_c$ by ω can be calculated by formula (48).

$$d_{c,\omega} = \begin{pmatrix} \cos\omega & 0 & \sin\omega \\ 0 & 1 & 0 \\ -\sin\omega & 0 & \cos\omega \end{pmatrix} d_c = \begin{pmatrix} \cos\omega\cos2\theta + \sin\omega\sin2\theta\cos\gamma_c \\ -\sin2\theta\sin\gamma_c \\ -\sin\omega\cos2\theta + \cos\omega\sin2\theta\cos\gamma_c \end{pmatrix} \quad (48)$$

When the angle formed by a normal line $s_\chi$ of the sample plane and $d_{c,\omega}$ becomes $\Psi_{max}$, $\gamma_c$ can be calculated by formula (49).

$$\gamma_c = \sin^{-1}\left(\frac{\cos\Psi_{max} + \sin\omega\cos2\theta\cos\chi}{\sin2\theta\sqrt{\sin^2\chi + \cos^2\omega\cos^2\chi}}\right) - \tan^{-1}\left(\frac{\cos\omega}{\tan\chi}\right) \quad (49)$$

From $\gamma_c$ which has been calculated in this way, $d_{c,\omega}$ can be determined. The unit vector $k_{c,\omega}$ of the diffraction vector of diffracted X-rays which have been detected at the point c within a plane of the detector can be calculated by formula (50).

$$k_{c,\omega} = \frac{d_{c,\omega} - i_\omega}{|d_{c,\omega} - i_\omega|} \quad (50)$$

The angle $\Psi_k$ formed by the diffraction vector which has been able to be measured under the appropriate measurement condition, and a normal line of the sample plane is obtained by formula (51).

$$\Psi_k = \begin{cases} \cos^{-1}(s_\chi \cdot k_{b,\omega}) & \text{when } \cos\Psi_{max} \leq d_{b,\omega} \cdot s_\chi \\ \cos^{-1}(s_\chi \cdot k_{c,\omega}) & \text{when } \cos\Psi_{max} > d_{b,\omega} \cdot s_\chi \end{cases} \quad (51)$$

Next, α is calculated by formula (52), and as shown in formula (53), $\chi_n$ and $\alpha_n$ (n=1, 2, 3, ...) are stored (step T7).

$$\alpha = \frac{\pi}{2} - \Psi_k \quad (52)$$

$$\alpha_n = \alpha$$
$$\chi_n = \chi \quad (53)$$

Next, as an end determination, whether or not $\Psi_k=\Psi_{kmax}$ is determined (step T8). As a result of the determination, when $\Psi_k=\Psi_{kmax}$ the determination of the measurement condition is terminated. When $\Psi_k \neq \Psi_{kmax}$, the value χ is updated by formula (54) (step T9).

$$\chi = \chi_0 + \Psi_k \quad (54)$$

Then, the incident angle of incident X-rays is confirmed (step T10). That is, whether or not the angle $\Psi_i$ formed by $-i_\omega$ and $s_\chi$ exceeds $\Psi_{max}$ is determined. The $\Psi_i$ is given by formula (55).

$$\cos \Psi_i = -i_\omega \cdot s_\chi = \sin \omega \cos \chi$$

$$\Psi_i = \cos^{-1}(\sin \omega \cos \chi) \quad (55)$$

As a result of the determination, when $\Psi_i$ exceeds $\Psi_{max}$, χ is changed so as to give $\Psi_i = \Psi_{max}$ as shown in formula (56) (step T11).

$$\cos \Psi_{max} = \sin\omega \cos\chi \quad (56)$$
$$\chi = \cos^{-1}\left(\frac{\cos \Psi_{max}}{\sin\omega}\right)$$

Then, the step number n is updated to n=n+1 (step T12) and processing returns to step T6. In addition, as a result of the determination of the step T10, when $\Psi_i$ does not exceed $\Psi_{max}$, processing directly proceeds to step T12. From the above-described calculation, ω and χ can be calculated. In addition, the processing carried out by the processing apparatus 100 as described above can be executed by a program.

[Example of Interface]

Figure 10:
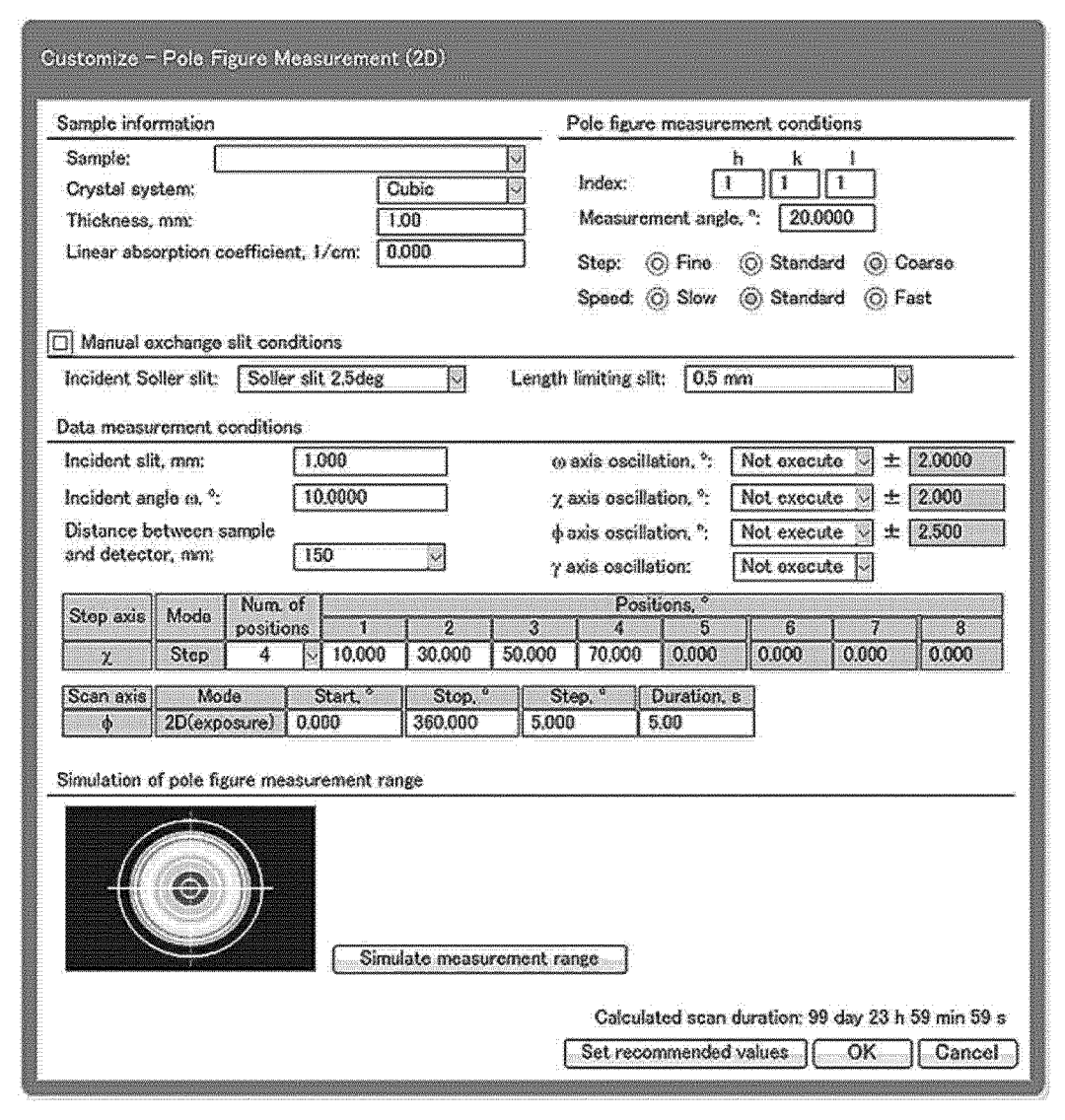

FIG. 10 is a diagram showing an example of an interface screen for displaying input and conditions. In an example of the screen, provided is an input region in which a material and its plane indices, or a diffraction angle can be set. Further, also provided is a region in which the distance between a sample and a detector can be optionally set. Further, in this interface screen, which range of the pole figure can be measured at each α step in the measurement condition which has been calculated can be displayed as a pole figure at the bottom of the screen. As a result, how the pole figure measurement is performed in advance can be confirmed. In addition, necessary measuring time under the measurement condition which has been determined may be calculated and displayed.

REFERENCE SIGNS LIST

50 Pole figure measurement system
100 Processing apparatus
110 Input unit
120 Condition determination unit
130 Processing control unit
140 Measurement control unit
150 Interface control unit
160 Output unit
170 Data storage unit
180 Analysis unit
200 Measuring apparatus
210 X-ray irradiation unit
220 Sample support unit
230 Two-dimensional detector
230*a* Detection plane
S Sample

What is claimed is:

1. A processing method for determining conditions of a pole figure measurement by X-ray diffraction, comprising the steps of:
    receiving an input of a diffraction angle 2θ; and
    determining an angle ω formed by an incident X-ray and an x-axis, and a tilt angle χ of a sample in each φ scan for a rotation angle φ within a sample plane so as to make a range of an angle α continuous from α=90° to α=0° without overlapping, the angle α being formed by the sample plane and a scattering vector, the range of the angle α are detectable at a time on a two-dimensional detection plane in the pole figure measurement at the diffraction angle 2θ, by calculating the range of the angle α based on an arrangement of the sample and the two-dimensional detection plane, and also a size of the two-dimensional detection plane,
    wherein determining the angle ω and the tilt angle χ is repeated.

2. The processing method according to claim 1, wherein the determining the angle ω and the tilt angle χ comprises determining the angle ω and the tilt angle χ in a first φ scan so that one end of an arc representing the range of the angle α that is detectable at a time on the two-dimensional detection plane, when the rotation angle φ within the sample plane is set to be constant, comes in contact with a position at which the angle α is 90°.

3. The processing method according to claim 1, wherein the determining the angle ω and the tilt angle χ comprises determining the angle ω and the tilt angle χ in a second or subsequent φ scan so that one end of an arc representing the range of the angle α detectable at a time on the two-dimensional detection plane, when the rotation angle φ is set to be constant, comes in contact with one end of an arc in an immediately preceding measurement stage.

4. The processing method according to claim 1, further comprising;
    preliminary displaying the range of the angle α detectable at a time on the two-dimensional detection plane in each φ scan, based on the determined angle ω and the determined tilt angle χ.

5. A processing apparatus that determines conditions of a pole figure measurement by X-ray diffraction, comprising:
    a processor configured to be controlled by a program to:
    receive an input of a diffraction angle 2θ;
    determine an angle ω formed by an incident X-ray and an x-axis, and a tilt angle χ of a sample in each φ scan for a rotation angle φ within a sample plane so as to make a range of an angle α continuous from α=90° to α=0° without overlapping, the angle α being formed by the sample plane and a scattering vector, the range of the angle α are detectable at a time on a two-dimensional detection plane in the pole figure measurement at the diffraction angle 2θ by calculating the range of the angle α based on the arrangement of the sample and the two-dimensional detection plane, and also a size of the two-dimensional detection plane; and
    repeatedly determines the angle ω and the tilt angle χ.

6. A non-transitory computer readable recording medium having recorded thereon a processing program for determining conditions of a pole figure measurement by X-ray diffraction, the processing program causing a computer to execute processes of:
    receiving an input of a diffraction angle 2θ; and
    determining an angle ω formed by an incident X-ray and an x-axis, and a tilt angle χ of a sample in each φ scan for a rotation angle φ within a sample plane so as to make a range of an angle α continuous from α=90° to $\alpha=0°$ without overlapping, the angle $\alpha$ being formed by the sample plane and a scattering vector, the range of the angle $\alpha$ are detectable at a time on a two-dimensional detection plane in the pole figure measurement at the diffraction angle $2\theta$ by calculating the range of the angle $\alpha$ based on the arrangement of the sample and the two-dimensional detection plane, and also a size of the two-dimensional detection plane, wherein determining the angle $\omega$ and the tilt angle $\chi$ is repeated.

* * * * *